(12) United States Patent
Sims et al.

(10) Patent No.: US 10,838,402 B2
(45) Date of Patent: Nov. 17, 2020

(54) DEFORMATION-BASED ADDITIVE MANUFACTURING OPTIMIZATION

(71) Applicant: University of Central Florida Research Foundation, Inc., Orlando, FL (US)

(72) Inventors: Robert Sims, Orlando, FL (US); Jim Inziello, Orlando, FL (US); Fluvio Lobo Fenoglietto, Orlando, FL (US); Jack Stubbs, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 128 days.

(21) Appl. No.: 16/223,911

(22) Filed: Dec. 18, 2018

(65) Prior Publication Data

US 2020/0064812 A1  Feb. 27, 2020

Related U.S. Application Data

(60) Provisional application No. 62/721,086, filed on Aug. 22, 2018.

(51) Int. Cl.
*G05B 19/4099* (2006.01)
*B29C 64/386* (2017.01)
*B33Y 50/00* (2015.01)
*B29C 64/112* (2017.01)

(52) U.S. Cl.
CPC ........ *G05B 19/4099* (2013.01); *B29C 64/386* (2017.08); *B33Y 50/00* (2014.12); *B29C 64/112* (2017.08); *G05B 2219/35134* (2013.01); *G05B 2219/49007* (2013.01)

(58) Field of Classification Search
CPC ........ B29C 64/386; G05B 2219/35134; G05B 2219/49007; G05B 19/4099; B33Y 50/00
See application file for complete search history.

(56) References Cited

U.S. PATENT DOCUMENTS

| | | | |
|---|---|---|---|
| 2017/0069127 A1* | 3/2017 | Umetani | B33Y 50/00 |
| 2017/0123407 A1* | 5/2017 | Shiihara | B29C 64/393 |
| 2019/0204810 A1* | 7/2019 | Radjou | B33Y 50/00 |
| 2019/0272346 A1* | 9/2019 | Weeger | B29C 64/393 |

OTHER PUBLICATIONS

J. Bonet and R. D. Wood, Communications in Numerical Methods in Engineering, Commun. Numer. Meth. Engng 2008; 24:1567-1568.

(Continued)

*Primary Examiner* — Mohammad Ali
*Assistant Examiner* — Vincent W Chang
(74) *Attorney, Agent, or Firm* — Nicholas Pfeifer; Smith & Hopen, P.A.

(57) ABSTRACT

A system and method that relies on the principles of material science, deformable body mechanics, continuum mechanics and additive manufacturing to reduce the costs associated with additive manufacturing. Physical properties are used by numerical solution methods, such as the Finite Element Method (FEM) or Smooth Particle Hydrodynamics (SPH), to deform an original model of an object to be manufactured into a viable configuration that reduces fabrication material, time, and cost when manufacturing an object through additive manufacturing.

16 Claims, 8 Drawing Sheets

(56) References Cited

OTHER PUBLICATIONS

SideFX, "Houdini," [Online]. Available: https://www.sidefx.com/. Accessed Feb. 13, 2019.
S. A. Maas, G. A. Ateshian and J. A. Weiss, "FEBio: Finite Elements for Biomechanics," Journal of Biomechanical Engineering, vol. 134, 2012.
M. Odeh, E. D. Nichols, F. Lobo Fenoglietto and J. Stubbs, "Real-Time, Non-Contact Position Tracking of Medical Devices and Surgical Tools through the Analysis of Magnetic Field Vectors," Proceedings of the 2018 Design of Medical Devices Conference, Apr. 9-12, 2018, pp. 1-5.
M. K. Rausch, G. E. Karniadakis and J. D. Humphrey, "Modeling Soft Tissue Damage and Failure Using a Combined Particle/Continuum Approach," Biomechanics and Modeling in Mechanobiology, vol. 16, No. 1, pp. 249-261, 2017.
OnShape, "OnShape," [Online]. Available: https://www.onshape.com/. Accessed Feb. 13, 2019.
E. B. Tadmor, R. E. Miller and R. S. Elliot, Continuum Mechanics and Thermodynamics: From Fundamental Concepts to Governing Equations, Contemporary Physics, 53:5, pp. 445-446.

* cited by examiner

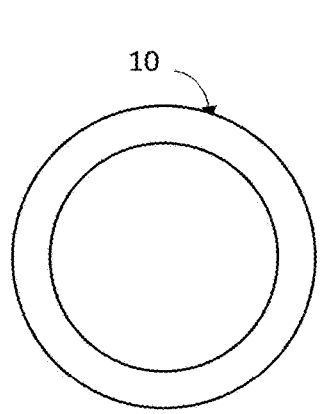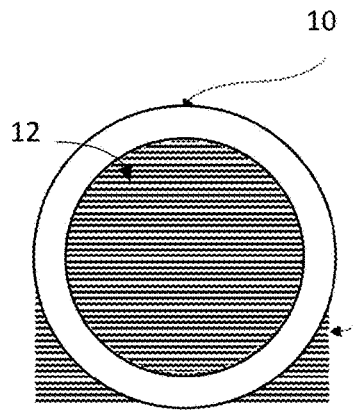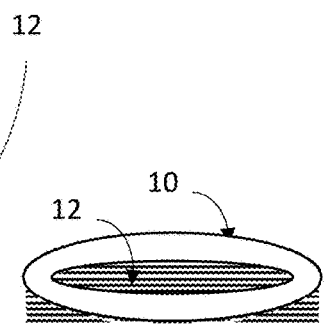
Fig. 1A　　　　　　　Fig. 1B　　　　　　　Fig. 1C
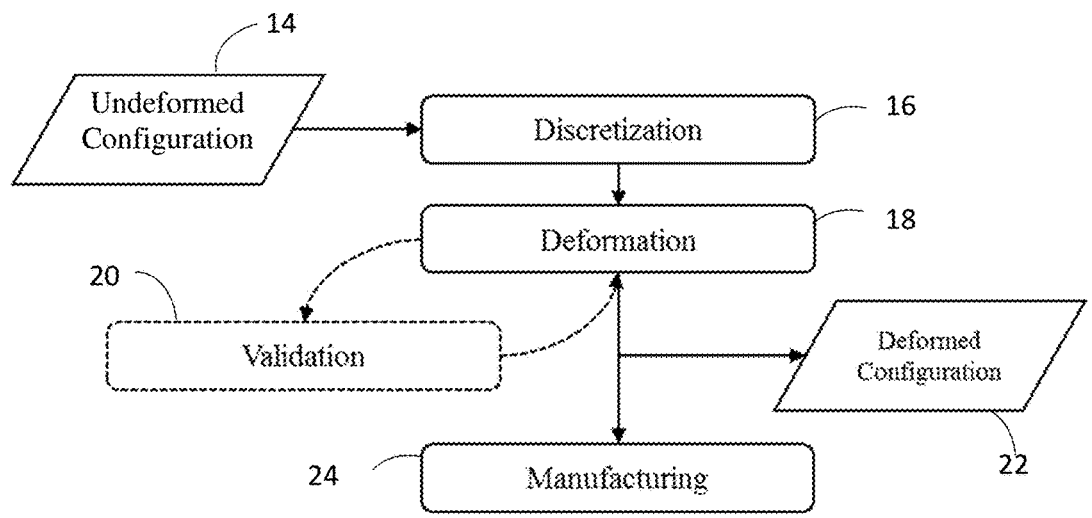
Fig. 2

DEFORMATION-BASED ADDITIVE MANUFACTURING OPTIMIZATION

CROSS-REFERENCE TO RELATED APPLICATIONS

This nonprovisional application claims priority to provisional application No. 62/721,086, entitled "DEFORMATION-BASED ADDITIVE MANUFACTURING OPTIMIZATION," filed Aug. 22, 2018 by the same inventors.

BACKGROUND OF THE INVENTION

1. Field of the Invention

This invention relates, generally, to additive manufacturing. More specifically, it relates to the optimization of additive manufacturing through the simulated deformation of the object to be manufactured.

2. Brief Description of the Prior Art

Additive manufacturing relies on support material for the fabrication of complex parts or assemblies featuring overhangs, enclosed volumes, or similar structures that would otherwise fail during manufacturing. The use of support material directly increases costs because more time and material are expended while building the support material. Costs also rise proportional to the time needed for the removal of the support material from the finished part. Even in the best-case scenario in which the support material simply dissolves in solution, costs are affected by the price of the solvents, time of dissolution, and drying time.

Accordingly, what is needed is a method of additive manufacturing to reduce or eliminate support material when manufacturing complex parts or assemblies that would typically require support material. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of additive manufacturing to reduce or eliminate support material when manufacturing complex parts or assemblies that would typically require support material is now met by a new, useful, and nonobvious invention.

The novel method for the reducing the time and costs associated with manufacturing an object through additive manufacturing, includes acquiring a digital model of the object to be manufactured, wherein the digital model has a first shape; discretizing the digital model; digitally altering the first shape of the discretized digital model to produce an altered digital model that requires less support material for additive manufacturing than would be necessary for additive manufacturing of the discretized digital model; sending the altered digital model to an additive manufacturing device; manufacturing the object in accordance with the altered digital model using the additive manufacturing device; and removing any support material from the object manufactured by the additive manufacturing device.

In an embodiment, the step of altering the shape of the discretized digital model includes elastically deforming the shape of the discretized digital model. In an embodiment, the step of altering the shape of the discretized digital model further includes applying a simulated force evenly about a body of the discretized digital model. An embodiment may also include reducing a cross-sectional area of the discretized digital model to reduce the amount of required support material to manufacture the object.

In an embodiment, the digital object to be manufactured includes one or more joints and the step of altering the shape of the discretized digital model further includes manipulating the shape of the discretized digital model about the one or more joints.

An embodiment further includes a step of validating that the object manufactured can be shaped into the unaltered shape of the digital model without plastically deforming. The step of validating may include identifying a manufacturing material; identifying limits for elastic deformation of the manufacturing material; and determining whether the step of altering the shape of the discretized digital model to produce the altered digital model includes a deformation beyond the limits for elastic deformation of the manufacturing material. Responsive to a determination that the altered digital model includes a deformation beyond the limits for elastic deformation of the manufacturing material, an embodiment alters the shape of the discretized digital model such that the deformation is within the limits for elastic deformation of the manufacturing material.

An embodiment further includes a step of optimizing the shape of the altered digital model to minimize the amount of required support material to manufacture the object. An embodiment may also include an estimation step during which the digital model of the object to be manufactured is divided into at least two segments, whereby each segment can be discretized and altered in shape to allow for segment-specific alteration-based optimization.

An embodiment of the novel method for the reducing the time and costs associated with manufacturing an object through additive manufacturing includes dividing the digital model of the object into at least two segments. The discretizing step also includes discretizing the segments to produce discretized segments of the digital model. Then the shape of at least one of the discretized segments can be altered to produce an altered digital model that requires less support material for additive manufacturing than would be necessary for additive manufacturing of the digital model. This embodiment further includes the steps of sending the altered digital model to an additive manufacturing device; manufacturing the object in accordance with the altered digital model using the additive manufacturing device; and removing any support material from the object manufactured by the additive manufacturing device.

The step of altering the shape of at least one of the discretized segments includes elastically deforming the shape of the at least one of the discretized segment in an embodiment. In an embodiment, the step of altering the shape of at least one of the discretized segments further includes applying a simulated force on at least one of the discretized segments. In an embodiment, the step of altering the shape of at least one of the discretized segments further includes reducing a cross-sectional area of the at least one discretized segment to reduce the amount of required support material to manufacture the object.

In an embodiment in which the digital model is divided into segments, the digital model to be manufactured includes one or more joints and the step of altering at least one of the discretized segments further includes manipulating the shape of the at least one discretized segment about the one or more joints.

An embodiment also includes a step of validating that the object manufactured can be shaped into the unaltered shape of the digital model without plastically deforming. The step of validating includes identifying a manufacturing material; identifying limits for elastic deformation of the manufacturing material; and determining whether the step of altering the shape of the discretized digital model to produce the altered digital model includes a deformation beyond the limits for elastic deformation of the manufacturing material. Responsive to a determination that the altered digital model includes a deformation beyond the limits for elastic deformation of the manufacturing material, the system alters the shape of at least one of the discretized segments such that the deformation is within the limits for elastic deformation of the manufacturing material.

An embodiment further includes a step of optimizing the shape of the altered digital model to minimize the amount of required support material to manufacture the object.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1A is a graphic representation of a virtual model of an object to manufactured using a standard method of additive manufacturing, shown on the left, can be deformed, as shown on the right, to reduce the amount of required support material to build the, which is provided in the middle.

FIG. 1B is a graphic representation of the virtual model in FIG. 1A with the necessary support material added to the object during a standard method of additive manufacturing.

FIG. 1C is a graphic representation of the virtual model in a deformed state with the necessary support material added to the object during additive manufacturing in accordance with the present invention.

FIG. 2 is a flowchart of an embodiment of the present invention.

DETAILED DESCRIPTION OF THE INVENTION

Figure 3:
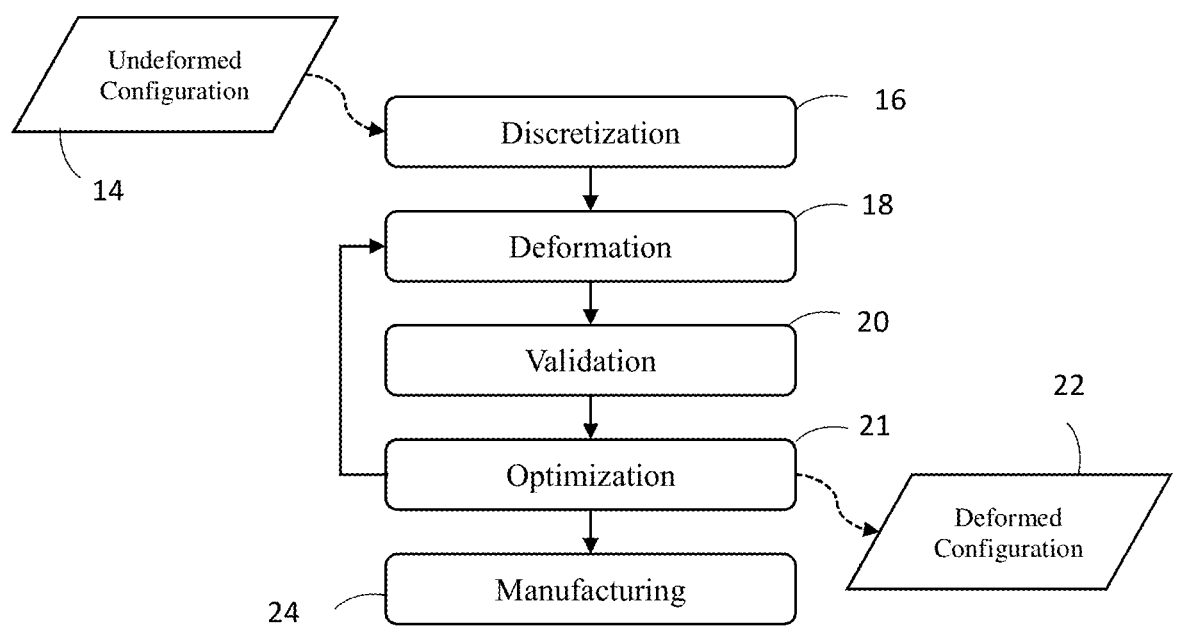
FIG. 3 is a flowchart of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Referring to FIG. 1, exemplary hollow object 10 shown in FIG. 1A represents an object to be manufactured. Standard additive manufacturing requires support material 12, both in and around desired object 10, as depicted in FIG. 1B. The depicted support material 12 increases material costs, printing time, and final preparation time because support material 12 must be removed post production. The present invention includes a system and method that dramatically reduces the use of support material 12, build time, and costs, by deforming the digital design of the original object 10 as shown in FIG. 1C. The deformation of the object reduces spaces that require support material, which results in far less support material 12.

The present invention, when presented with an input model of an original/undeformed object or the original/undeformed object itself, will create a digital model or use the input model of the original/undeformed object itself and then strategically deform the digital model of the object into viable printable configurations. In an embodiment, the present invention uses physical simulation methods, such as finite element analysis (FEA) and smooth particle hydrodynamics (SPH), to generate a viable deformed configuration of the digital design for the original object or combination of object segments.

Referring now to FIG. 2, an embodiment of the present invention begins with retrieving and/or creating an undeformed, preferably 3-dimensional, digital model of the object to be manufactured at step 14. In an embodiment, the undeformed digital model of the object is divided into a plurality of segments or may be treated as a single segment. Object segmentation is further discussed below.

At step 16, the model is discretized using standard discretization methods known to a person of ordinary skill in the art. The discretization step 16 discretizes or divides the undeformed digital model of the object, or at least one undeformed segment of the digital model into finite single or multi-dimensional elements. Characteristics of these elements depend on the simulation method to be used on the object. For example, FEA requires discretization in 2D or 3D elements, while SPH requires discretization in particles.

The discretized digital model, or at least one segment of the discretized digital model, is then deformed/altered in shape at step 18 using, e.g. standard meshing tools and physical simulation methods, such as FEA or SPH. In an embodiment in which the digital model has been divided into a plurality of segments, deformation may be limited to a subset of the plurality of discretized, undeformed segments. Moreover, the deformation of each discretized, undeformed segment can be independent and may differ from other discretized, undeformed segments.

The deformation of the discretized, undeformed digital model of the object or segments may be strain- or force-induced, including but not limited to compressing, collapsing, stretching, twisting, bending, and torqueing the digital model of the object or segments of the objects. Moreover, the deformation may be achieved in several ways, including but not limited to; applying a force or strain to a single or multiple nodes, facets, elements or locations on the body of the discretized model, simulating an internal and/or external pressure force from within and/or around the discretized model, and applying non-uniform forces at different locations along the body of the discretized model. For example, the system or user compresses or collapses the digital model of the object using a body force, e.g. gravity (Weight=mass*gravity). The force may be applied to a center of mass and the program simulates how the digital model would come to a resting position and deform.

Deformation may also include the manipulation of an adjustable object about the object's points of adjustment. For example, the object may include hinges or other mechanical structures that allow the object to alter in shape or size as needed for the object to perform its intended function. For such an object, the deformation step 18 may be a nondeforming adjustment of the object about its points of adjustment rather than an elastic deformation of the object. Elastic deformation, however, may be combined with a nondeforming adjustment of the object about its points of adjustment during the deformation step.

The embodiment depicted in FIG. 2, further includes validation step 20. Validation refers to the invention's capacity to corroborate the viability of the deformation based on an understanding of the physical properties/characteristics of the material(s), structure, and shape of the object. The physical properties of the materials are used to determine elastic and plastic deformation limits. The validation step ensures that the simulation is possible, and the material used during printing can recover from the deformation. This can be accomplished by referencing material properties or simulating the opposite deformation.

Knowing the elastic and plastic deformation limits, the amount of stress/strain to be applied to the model is determined to avoid plastic deformation. The system or a user sets a maximum stress/strain limit and the system applies corresponding forces to avoid exceeding the maximum stress/strain limit. The level of deformation must not exceed a recoverable deformed configuration, i.e. the level of deformation must not exceed elastic deformation for an elastic object. By manufacturing the object within the elastic or recoverable region of the material's physical characteristics, the object can be manufactured in a deformed state and then the final manufactured object can be manipulated/deformed to the desired usable configuration with low risk of the object failing from stress, i.e. plastically deforming and/or breaking.

The validation step may also consider the degree of movement of sections of the object about its hinges or other mechanical structures. For example, a certain hinge may only allow for 120 degrees of rotation. The validation step ensures that the degree of proposed movement about the objects mechanical structures does not extend beyond the physical capabilities of the mechanical object. The physical capabilities of the mechanical object may be predefined or entered by a user.

Once the deformed or altered configuration is validated, the system manufactures the object using additive manufacturing at step 24. In an embodiment, the deformed configuration is first presented to the user at step 22. In an embodiment, the deformed model is presented to a user at step 22 and waits for user instruction on whether to move on to manufacturing step 24.

Referring now to FIG. 3, an embodiment includes optimization step 21. Optimization step 21 enhances the deformation of the discretized, undeformed model of the object, or at least one discretized, undeformed segment, with the purpose of minimizing support material, print time, and associated costs. Given at least one viable deformed segment, the optimization process may force reiterations of the deformation and validation processes to reduce support material, print time, and associated costs. Reiteration includes the alteration of deformation parameters such as, but not limited to; deformation type (force, strain, pull, compression, torque, etc.), deformation scheme (orientation, boundary conditions, etc.), deformation magnitude (increase or decrease force, strain, etc.), and material and material properties. Boundary conditions refer to the identification of certain portions of the digital object that are intended to have different properties in relation to other portions of the object. The consideration is similar to how a segmented object can be deformed differently for different segments. For example, an object to be printed may include a rigid portion and a flexible portion. The system and method allows a user to create a digital boundary, such as boundary line 44 in FIG. 6, for either portion and set material properties and other characteristics for the bounded portion of the object.

Optimization step 21 may also include automated suggestions regarding the use of different printing materials available to the printer in order to improve outcomes. Printing materials may vary in mechanical properties (e.g. elasticity, rigidity, compliance), thus yielding different deformed configurations, build times, and material usage. Suggestions are based on the materials available to the printer or materials that can be made by the printer. Suggestions may leverage additional methods for the design and manufacture of composites, which may yield custom mechanical responses.

An embodiment of the optimization step 21 also includes optimization for each identified segment of the digital object when the object has been divided into segments. Suggestions would also be provided by segment.

The result of the optimization routine 21 may entail single or multiple solutions. When multiple solutions are returned, there may be some configurations that only minimize material, time, or associated costs rather than minimizing all three. Likewise, some solutions may optimize two of the three optimization factors. Preferably each embodiment having an optimization routine includes a validation step occurring at the end of every optimization loop to ensure that alternative deformation parameters and/or deformation scheme are plausible and within the mechanical properties of the materials.

In an embodiment, optimization step 21 is performed a set number of times and the iteration that reduces the most support material, print time, and associated costs is selected to be manufactured. Alternatively, an embodiment may include a minimum threshold for the reduction in support material, print time, and/or associated costs, which is used as an indicator as to whether the deformed model is moved to manufacturing step 24. The system may also, or alternatively, present the optimized deformation to a user at step 22 during which the user can instruct the system to continue optimization or send the deformed model to manufacturing step 24.

Figure 4:
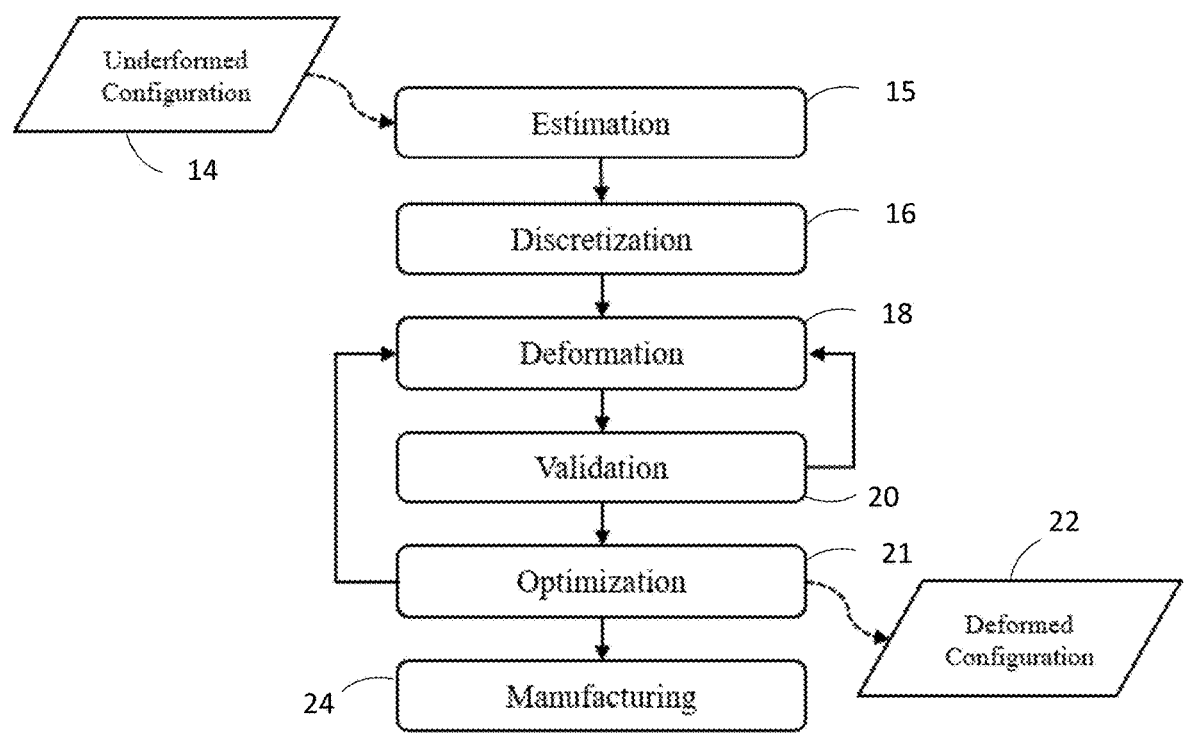
FIG. 4 is a flowchart of an embodiment of the present invention.

Referring now to FIG. 4, the system includes an initial estimation step 15 following retrieval of the undeformed configuration at step 14. Estimation step 15 includes determining, calculating and/or estimating a baseline print path, support material requirement, and support material distribution. These parameters are usually obtained through a standard process called "slicing." Three dimensional printer manufacturers usually distribute their own slicer, while a few community-driven examples do exist. While slicers typically rely on surface cuts, estimation step 15 improves upon the standard slicing process by applying a voxelizer. The voxelizer divides/segments the object into voxels (i.e. 3D pixels/volumetric points). By identifying the print path and the necessary amount of support material to manufacture the undeformed object, estimation step 15 enables the object to be segmented based on the distribution of the support material. This is done specifically to allow for segment-specific deformation-based optimization. In addition to print path and overall support material requirements, estimation step 15 results in at least one segment of the original object model, based on the support material distribution. When there is only one segment, that segment entails the entire object model.

Consider for example a model of a skull having various compartments that require different amounts of support material or a flexible telescoping tube that has rigid, non-flexible regions that should not be deformed during the manufacturing process. Each object to be manufactured may have regions/segments that deform more or less than others. Estimation step 15 helps identify these segments that require different amounts of support and deformation.

To accomplish the variability of deformation, estimation step 15 automatically segments the object using the voxelizer. The voxelizer estimates the amount of support material required to manufacture the entire object. Segments are determined by the distribution of the support. Automation may be dependent on user inputted requirements. For example, if the only requirement is to reduce support by a set percentage or value, then the degree of deformation can be scaled up to increase the deformation as needed for each segment. In this case, segments requiring more support will undergo a more significant deformation. Another example includes requiring a specific type of support structure to be suppressed. Types of support include, but are not limited to, (1) from part, (2) from build platform. Overhangs directly above the build platform require support that originates from the build platform. The link between cylindrical channels in FIGS. 6A-6D requires support from the build platform. A requirement may specifically target the suppression of this type of support, as it is the most wasteful. The requirement would then force a more significant deformation on segments supported from the build platform. Estimation step 15 may also consider the rigidity/flexibility and the structural properties of the object to be manufactured, which can be input by a user on a segment by segment basis.

Figure 5:
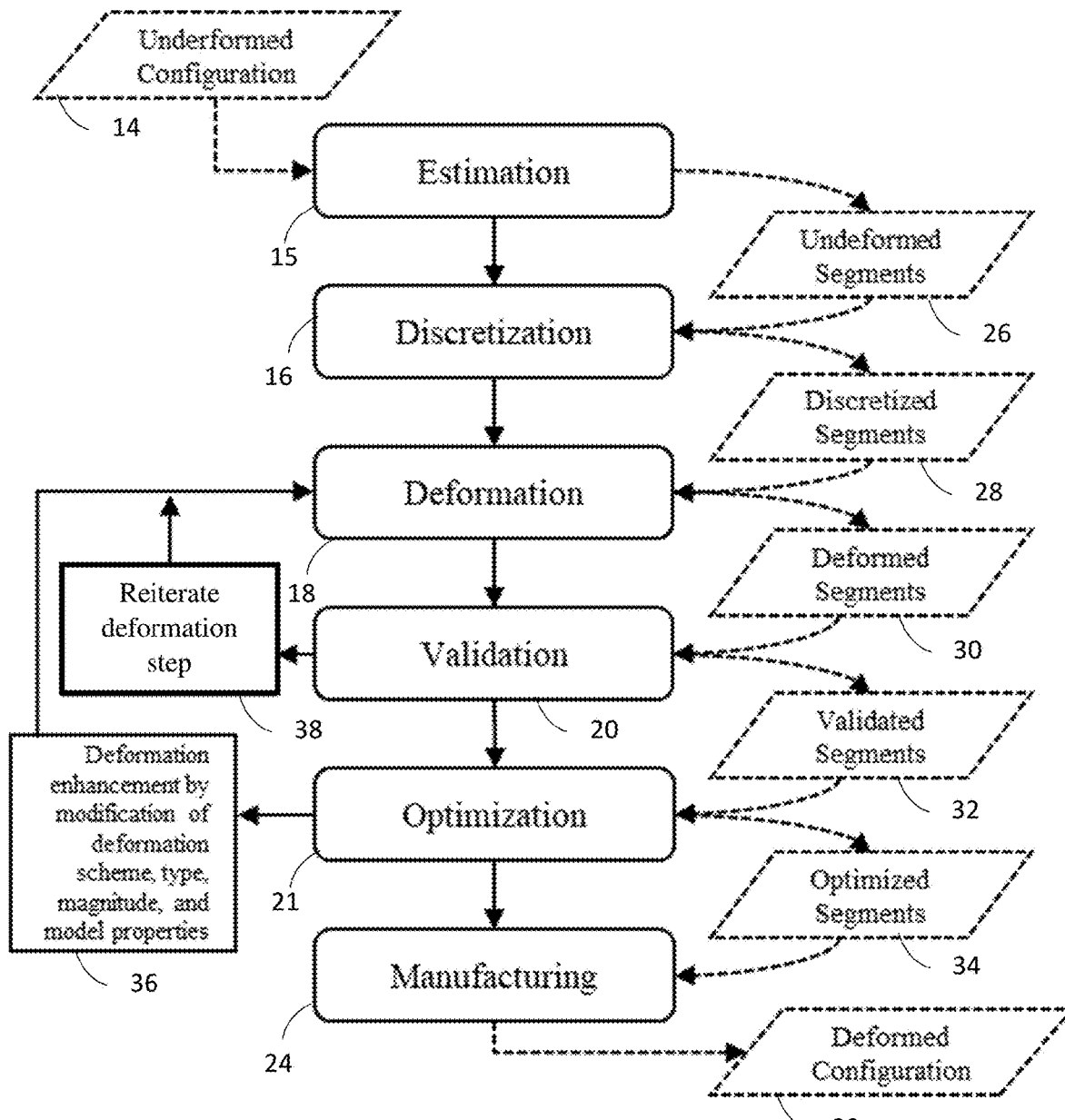
FIG. 5 is a flowchart of an embodiment of the present invention.

FIG. 5 provides a flowchart depicting how the present invention handles a segmented object. The system first acquires or is presented with a digital model of the unaltered/undeformed configuration of the object to be manufactured at step 14. At estimation step 15, the system determines, calculates or estimates the baseline print path, support material requirement, and support material distribution.

The estimation step further segments the original unaltered/undeformed object either automatically or via user interaction. The segmentation compensates for regions of the object that have different material properties and/or different intended uses. For example, the exemplary object in FIGS. 6A-6D is segmented/divided into two regions 40, 42 by a user-added segmentation line 44. In this example, region 40 is identified as a segment to be deformed during manufacturing, while region 42 is will not be deformed during manufacturing. While the example provided above relies on a segmentation line 44, an embodiment may rely on any type of digital communication to segment a digital model of an object, including, but not limited to, slicing, encircling, highlighting, and using a coordinate system.

Following the segmentation in the estimation step 15, an embodiment of the system outputs the undeformed segmented model of the object to the user at step 26. The user has the option to modify the segments as deemed necessary. Once the user has accepted the segmentation or finalized the segmentation of the undeformed model, the system discretizes the segmented model at step 16. In an embodiment, the discretized segments are presented to the user in step 28. Again, the user may be presented with the option to modify the discretized segments as shown in step 28.

The system continues to deformation step 18 during which the discretized segments are deformed as described previously herein. If certain segments are identified by the user or system as segments not to be deformed, then those segments are not deformed. In an embodiment, the system provides a user with the information regarding which segments are to be deformed, how they will be deformed, and to what degree they will be deformed in step 30. The user has the option to adjust the deformation plan for each segment.

Once the deformation plan has been finalized and/or approved by the user, the deformation plan is validated in step 20. Validation step 20 ensures that the imposed deformation falls within the recoverable or elastic range of the material(s) that constitute the original object. If at least one of the deformed segments does not represent a viable deformed segment, the system, at step 38, reverts back to deformation step 18 to reiterate the deformation process 18. Deformation step 18 then alters parameters such as, but not limited to, the magnitude of the deformation. In an embodiment, the validation information is presented to the user at step 32 and the user can modify the validation information for each segment.

Following validation of the deformation of each segment, the system optimizes the deformation of each segment at step 21 to minimize support material, print time, and associated costs. If the system determines that the deformation can be further optimizes, the at step 36, the system instructs the reiteration of deformation step 18 to modify the deformation scheme, type of deformation, magnitude of deformation, and/or material properties. In an embodiment, the optimization information is presented to the user at step 34 and the user can override or approve the reiteration of deformation step 18.

Figure 6A:
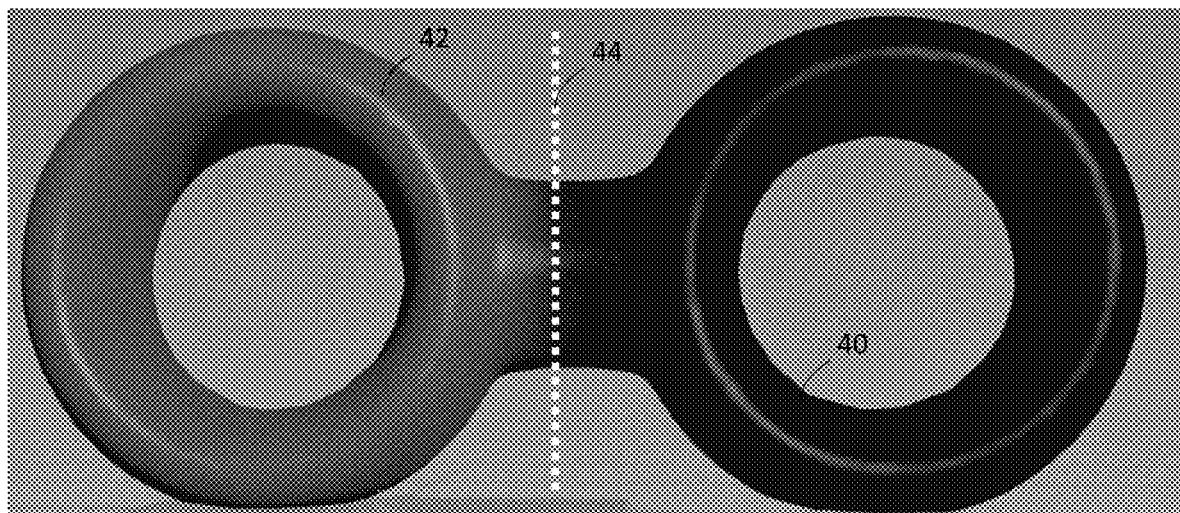
FIG. 6A is digital representation of an object being segmented.
Figure 6B:
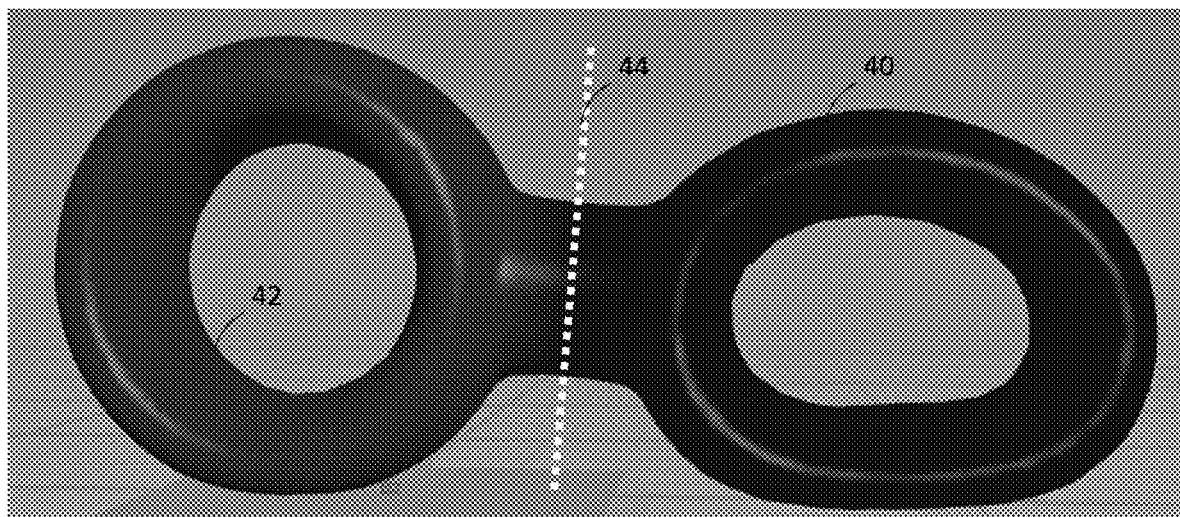
FIG. 6B is a digital representation of a single segment being deformed.
Figure 6C:
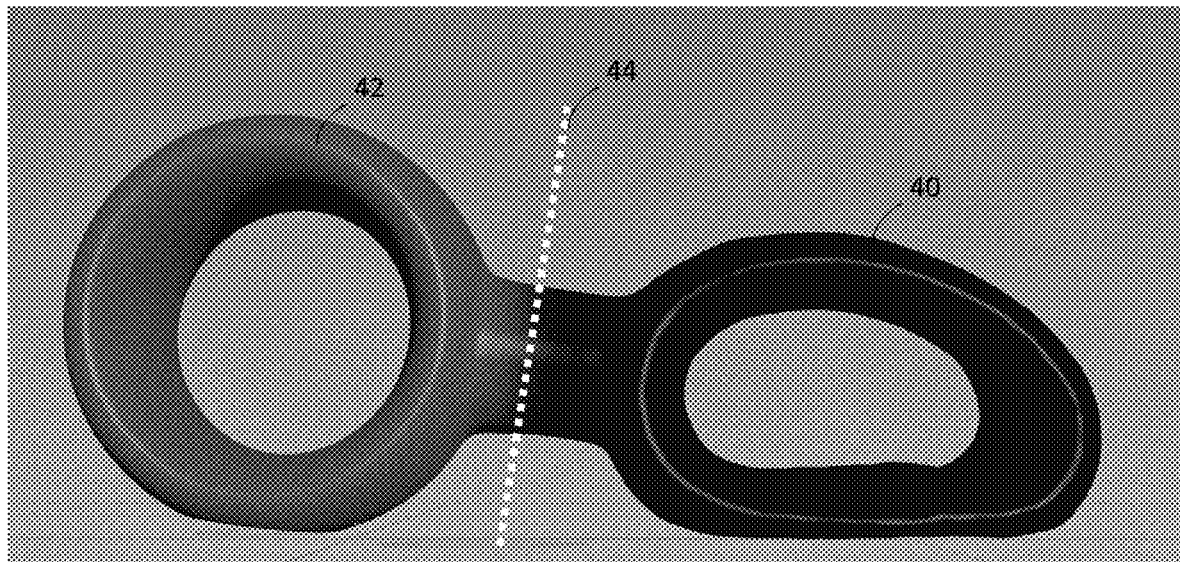
FIG. 6C depicts the same digital representation as shown in FIG. 6B, but with a greater deformation force having been applied to the same segment being deformed in FIG. 6B.
Figure 6D:
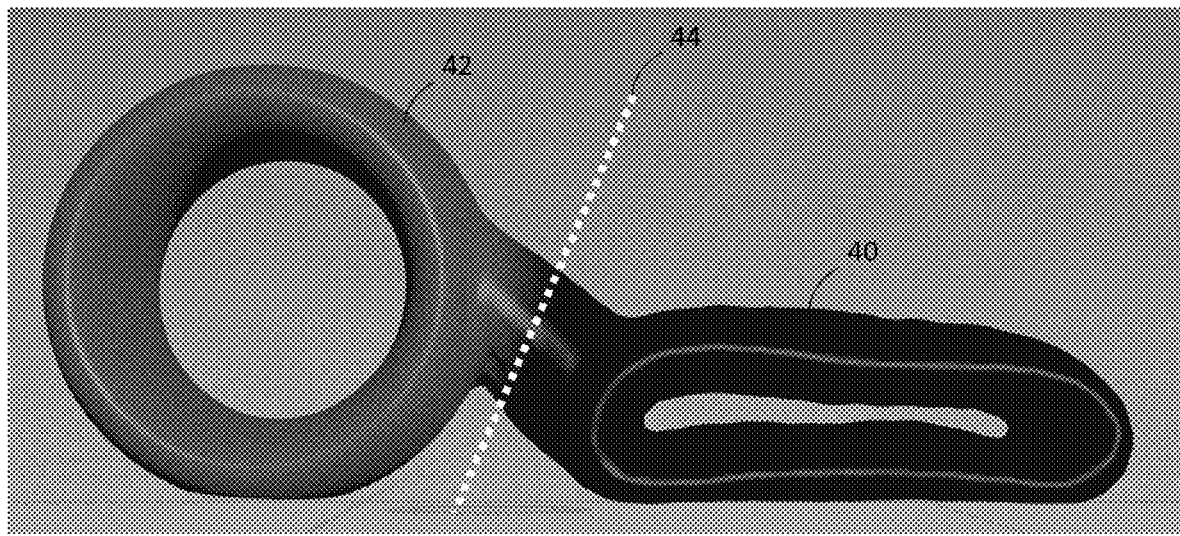
FIG. 6D depicts the same digital representation as shown in FIG. 6C, but with a greater deformation force having been applied to the same segment being deformed in FIG. 6C.

An example of optimization step 21 is depicted in FIGS. 6B-6D. FIG. 6B depicts a first iteration of the deformation and the optimization step 21 determined that region 40 can be further deformed to reduce support material. A second iteration is performed and deformation process 21 further deforms region 40 as shown in FIG. 6C. After validation, the system again determines whether the deformation can be further optimized. In doing so, the system performs another reiteration of the deformation step. In this illustrative example, deformation process 21 produces the deformation shown in FIG. 6D and region 40 is considered to be optimized according to automated or user determined limits.

After the deformation has been properly validated, a digital template of the deformed configuration is communicated to the additive manufacturing device for manufacturing step 24. The additive manufacturing device may be a 3-dimensional printer type device and the information is communicated to the additive manufacturing device, using common communication techniques known to a person of ordinary skill in the art, such as wired or wireless communication. Upon receipt of the deformed configuration by the additive manufacturing device, support material is added to the template as needed and the modeled object is printed in a deformed configuration. Once manufactured, the support material is removed, and the object is ready for use. For a multi-segmented object, each segment is manufactured to produce the complete object.

In an embodiment, the deformed configuration is first presented to the user at step 22. In an embodiment, the deformed model is presented to a user at step 22 and waits for user instruction on whether to move on to manufacturing step 24. Moreover, the digital template of the deformed configuration may be modified as necessary by a user at step 22. The modification may be performed in accordance with techniques known to a person of ordinary skill in the art to place the template into a proper format for a particular additive manufacturing device.

The present invention may be used for both flexible and rigid devices and assemblies. As explained above, when the object to be manufactured is flexible, the system simulates an elastic deformation on the model of the object to reduce the cross-sectional area of the model. When the object is rigid, it must be foldable or have mechanical components, e.g. hinges, that allow the object to alter its shape. The deformation step includes the steps of identifying the mechanical components and their direction of movement and altering the orientation of the object about its mechanical components to reduce the cross-sectional area of the model. The system may rely on user input to determine the mechanical components and their directions of movement. It should be noted that the rigid devices and assemblies introduced herein include objects that are not completely inelastic, but rather have tighter elastic limits which result in minimal/negligible elastic deformation.

An embodiment of the novel method uses a procedural template developed for Houdini [5, 6]. However, the method is independent to the Houdini platform, as it can be demonstrated using a combination of computer aided design and FEA platforms, such as OnShape and FEBio (respectively) [3, 7]. Houdini enables the execution of more complex and faster simulations and also enables the addition of import and export tools for the input and output configurations of the 3D model.

Experimentation

Figure 7:
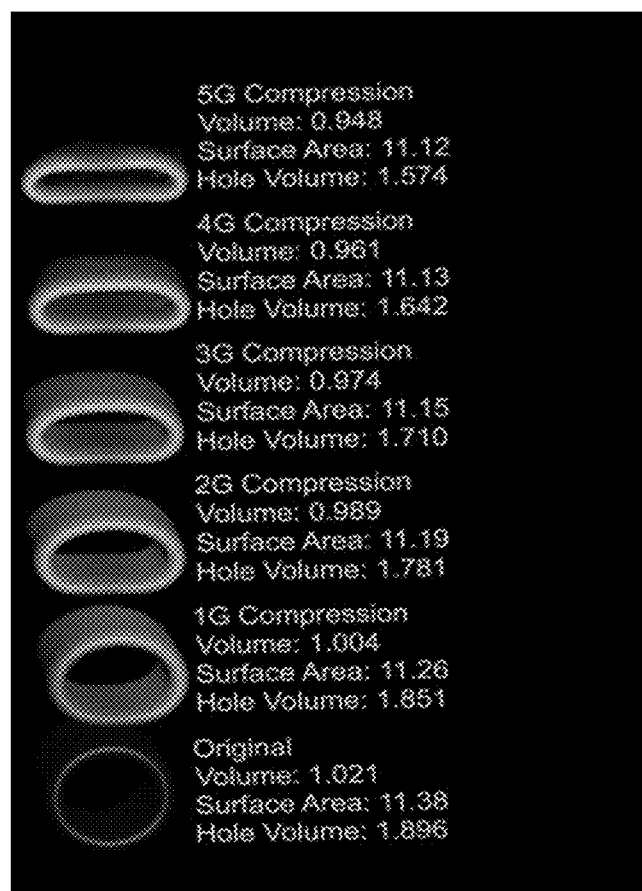
FIG. 7 is a chart depicting deformation of a model through the application of a uniform force, such as gravity.
Figure 8:
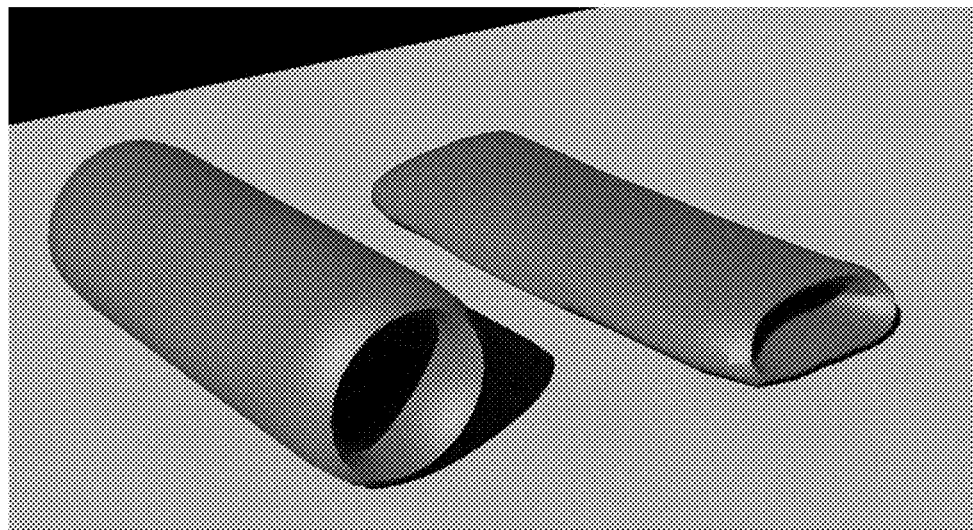
FIG. 8 is a perspective view of two digital models of an elastic sleeve shown in an undeformed configuration on the left and a deformed configuration on the right.
Figure 9:
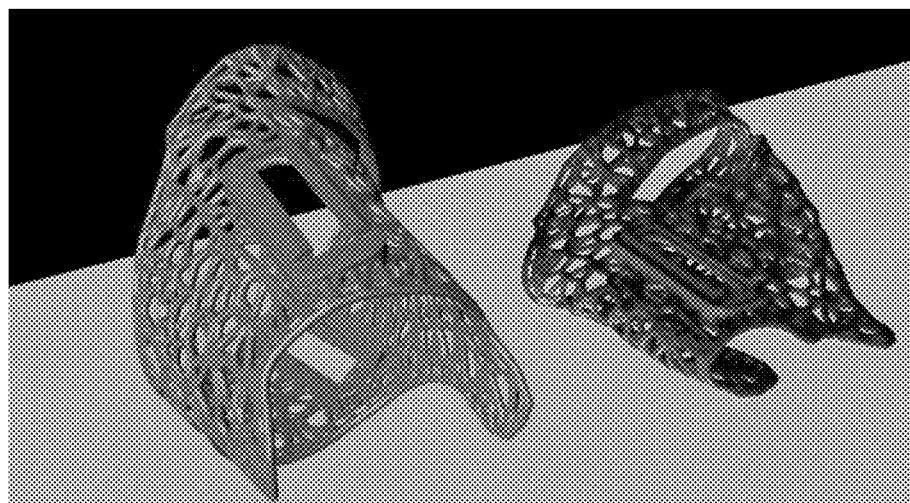
FIG. 9 is a perspective view of two digital models of an elastic brace shown in an undeformed configuration on the left and a deformed configuration on the right.

A procedural template was created to authenticate the disclosed invention and present results that highlight its immediate impact on the field additive manufacturing [5]. A standard cylinder as depicted in FIG. 8 was tested. The model of the object was deformed to reduce material, time, and costs during additive manufacturing. First, the template was used to demonstrate uniform deformations on an input body as depicted in FIGS. 7-9. Gravity, a body force, was used to demonstrate the enforcement of a uniformly-distributed force. The template was also designed to generate measurements of area and volume, which were used to roughly estimate the reduction in build time and support material, which are depicted in FIG. 7. The simulation results rely heavily on the input parameters of the FEM embedded within Houdini. Higher resolution model meshes or more accurate model material parameters can ensure more realistic simulation results. The results shown herein are proof-of-concept results.

An optimization protocol was used to adjust the deformation parameters to minimize the amount of printing material, time, and associated costs. The optimization of the deformation parameters included adjusting the body force values (e.g. modifying the gravity variable by 1G, 2G, 3G etc.). As explained above, the optimization of the deformation scheme is not restricted to modifying force values, but can also include optimizing the type of deformation (e.g. compression, tension, etc.) and the orientation of the digital model and/or forces to determine which orientation and deformation will result in the fastest and least expensive manufacturing.

The result of the optimization routine may entail single or multiple solutions. As depicted in FIG. 7, multiple solutions were returned and validated until a 5G compression was determined to minimize material, time, and associated costs without exceeding the elastic deformation limits of the material of the object.

Having finished the procedural template, two sample models of orthotic sleeves, as shown in FIGS. 8-9, were used to measure real estimates of time and material reduction. FIG. 8 depicts a simple tubular model that was designed to take a significant percentage of the Stratasys PolyJet J750 build volume. FIG. 9 depicts a more complex model based on the 3D scanning of a human arm and was designed as a real case scenario of an orthotic build. Both models were compressed using the procedural template and both the undeformed versions 50, 60 and deformed versions 52, 62 were sliced using Grab Cad Print (a default slicer for the PolyJet systems) to compare build time and material usage. For the simple model, the method reduced build time by 40% and the amount of support material by 52%, which translates to approximate $168 worth of material savings. Two tray estimation tables are provided below for the simple cylinder model.

| Tray Estimations | | |
|---|---|---|
| | | High Quality |
| Pre-Compressed Cylinder | Print Time | 2 d 19 h 1 m |
| | Total Materials (g) | 5,269 |
| | Total Support (g) | 4,993 |
| | VeroCyan | 4,757 |
| | VeroPureWhite | 512 |
| | SUP706 | 4,993 |

| Tray Estimations | | |
|---|---|---|
| | | High Quality |
| Compressed Cylinder | Print Time | 1 d 16 h 6 m |
| | Total Materials (g) | 4,191 |
| | Total Support (g) | 2,405 |
| | VeroMgnt | 3,941 |
| | VeroPureWhite | 250 |
| | SUP706 | 2,405 |

The method of the present invention reduced the complex model's build time by 56% and the amount of require support material by 54%, which translates to over $1,000 in savings in machine time. Two tray estimation tables are provided below for the complex model.

| Tray Estimations | | |
|---|---|---|
| | | High Quality |
| MYO_holder_Upper_1.2 | Print Time | 2 d 21 h 58 m |
| | Total Materials (g) | 497 |
| | Total Support (g) | 2,336 |
| | VeroCyan | 263 |
| | VeroPureWhite | 234 |
| | SUP706 | 2,336 |

| Tray Estimations | | |
|---|---|---|
| | | High Quality |
| MYO_holder_Upper_1.2_Collapsed | Print Time | 1 d 6 h 31 m |
| | Total Materials (g) | 323 |
| | Total Support (g) | 1,058 |
| | VeroCyan | 216 |
| | VeroPureWhite | 107 |
| | SUP706 | 1,058 |

In both cases, a more than 40% reduction in time translated to more than 24 hours, while a more than 50% reduction in material equated to more than ⅓ of the support cartridge's volume. The experimentation clearly shows that the present invention is a significant improvement to existing additive manufacturing technology due to its ability to drastically reduce the time, material, and costs associated with additive manufacturing.

REFERENCES

[1] E. B. Tadmor, R. E. Miller and R. S. Elliot, Continuum Mechanics and Thermodynamics: From Fundamental Concepts to Governing Equations, Cambridge University Press, 2012.

[2] J. Bonet and R. D. Wood, Nonlinear Continuum Mechanics for Finite Element Analysis, Cambridge, N.Y.: Cambridge University Press, 1997.

[3] S. A. Maas, G. A. Ateshian and J. A. Weiss, "FEBio: Finite Elements for Biomechanics," *Journal of Biomechanical Engineering*, vol. 134, 2012.

[4] M. K. Rausch, G. E. Karniadakis and J. D. Humphrey, "Modeling Soft Tissue Damage and Failure Using a Combined Particle/Continuum Approach," *Biomechanics and Modeling in Mechanobiology*, vol. 16, no. 1, pp. 249-261, 2017.

[5] R. Sims, "Compression Simulation Template for Houdini," Orlando, 2018.

[6] SideFX, "Houdini," [Online]. Available: https://www.sidefx.com/. [Accessed 15 Jul. 2018].

[7] OnShape, "OnShape," [Online]. Available: https://www.onshape.com/. [Accessed 23 Jan. 2017].

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for the reducing the time and costs associated with manufacturing an object through additive manufacturing, comprising:
    acquiring a digital model of the object to be manufactured, wherein the digital model has a first unaltered shape;
    discretizing the digital model;
    digitally altering the first shape of the discretized digital model to produce an altered digital model that requires less support material for additive manufacturing than would be necessary for additive manufacturing of the discretized digital model;
    validating that the object to be manufactured can be shaped into the first unaltered shape without plastically deforming, wherein validating further includes:
        identifying a manufacturing material;
        identifying limits for elastic deformation of the manufacturing material; and
        determining whether the step of altering the first shape of the discretized digital model to produce the altered digital model includes a deformation beyond the limits for elastic deformation of the manufacturing material;

responsive to a determination that the altered digital model includes a deformation beyond the limits for elastic deformation of the manufacturing material, adjusting the altered shape of the discretized digital model such that the deformation is within the limits for elastic deformation of the manufacturing material;

sending the altered digital model to an additive manufacturing device;

manufacturing the object in accordance with the altered digital model using the additive manufacturing device; and removing any support material from the object manufactured by the additive manufacturing device.

2. The method of claim 1, wherein the step of altering the shape of the discretized digital model includes elastically deforming the shape of the discretized digital model.

3. The method of claim 1, wherein the step of altering the shape of the discretized digital model further includes applying a simulated force evenly about a body of the discretized digital model.

4. The method of claim 1, wherein the step of altering the shape of the discretized digital model further includes reducing a cross-sectional area of the discretized digital model to reduce the amount of required support material to manufacture the object.

5. The method of claim 1, wherein the digital object to be manufactured includes one or more joints and the step of altering the shape of the discretized digital model further includes manipulating the shape of the discretized digital model about the one or more joints.

6. The method of claim 1, further including a step of validating that the object manufactured can be shaped into the unaltered shape of the digital model without plastically deforming.

7. The method of claim 1, further including a step of optimizing the shape of the altered digital model to minimize the amount of required support material to manufacture the object.

8. The method of claim 1, further including an estimation step during which the digital model of the object to be manufactured is divided into at least two segments, whereby each segment can be discretized and altered in shape to allow for segment-specific alteration-based optimization.

9. A method for the reducing the time and costs associated with manufacturing an object through additive manufacturing, comprising:

acquiring a digital model of the object to be manufactured, wherein the digital model has an unaltered shape;

dividing the digital model of the object into at least two segments;

discretizing the segments to produce discretized segments of the digital model;

altering a shape of at least one of the discretized segments to produce an altered digital model that requires less support material for additive manufacturing than would be necessary for additive manufacturing of the digital model;

validating that the object to be manufactured can be shaped from the altered shape to the unaltered shape without plastically deforming, wherein validating further includes:

identifying a manufacturing material;

identifying limits for elastic deformation of the manufacturing material; and determining whether the step of altering the shape of at least one of the discretized segments to produce the altered digital model includes a deformation beyond the limits for elastic deformation of the manufacturing material;

responsive to a determination that the altered digital model includes a deformation beyond the limits for elastic deformation of the manufacturing material, adjusting the altered shape of at least one of the discretized segments such that the deformation is within the limits for elastic deformation of the manufacturing material;

sending the altered digital model to an additive manufacturing device;

manufacturing the object in accordance with the altered digital model using the additive manufacturing device; and removing any support material from the object manufactured by the additive manufacturing device.

10. The method of claim 9, wherein the step of altering the shape of at least one of the discretized segments includes elastically deforming the shape of the at least one of the discretized segment.

11. The method of claim 9, wherein the step of altering the shape of at least one of the discretized segments further includes applying a simulated force on at least one of the discretized segments.

12. The method of claim 9, wherein the step of altering the shape of at least one of the discretized segments further includes reducing a cross-sectional area of the at least one discretized segment to reduce the amount of required support material to manufacture the object.

13. The method of claim 9, wherein the digital model to be manufactured includes one or more joints and the step of altering at least one of the discretized segments further includes manipulating the shape of the at least one discretized segment about the one or more joints.

14. The method of claim 9, further including a step of validating that the object manufactured can be shaped into the unaltered shape of the digital model without plastically deforming.

15. The method of claim 9, further including a step of optimizing the shape of the altered digital model to minimize the amount of required support material to manufacture the object.

16. A method for the reducing the time and costs associated with manufacturing an object through additive manufacturing, comprising:

acquiring a digital model of the object to be manufactured, wherein the digital model has an undeformed shape;

dividing the digital model of the object into at least two segments;

discretizing the segments to produce discretized segments of the digital model;

deforming a shape of at least one of the discretized segments to produce a deformed digital model that requires less support material for additive manufacturing than would be necessary for additive manufacturing of the digital model;

validating that the object to be manufactured can be shaped into the undeformed shape of the digital model after it is manufactured without plastically deforming;

responsive to a determination that the object to be manufactured cannot be shaped into the undeformed shape of the digital model after it is manufactured without plastically deforming, adjusting an amount of deformation of at least one of the discretized segments such that the deformation is within a limit for elastic deformation of the object to be manufactured;
sending the deformed digital model to an additive manufacturing device;
manufacturing the object in accordance with the deformed digital model using the additive manufacturing device; and
removing any support material from the object manufactured by the additive manufacturing device.

\* \* \* \* \*